March 8, 1949.  A. ORSCHELN  2,464,097
BRAKE OPERATING OR SIMILAR MECHANISM
Filed Aug. 25, 1947  2 Sheets-Sheet 1
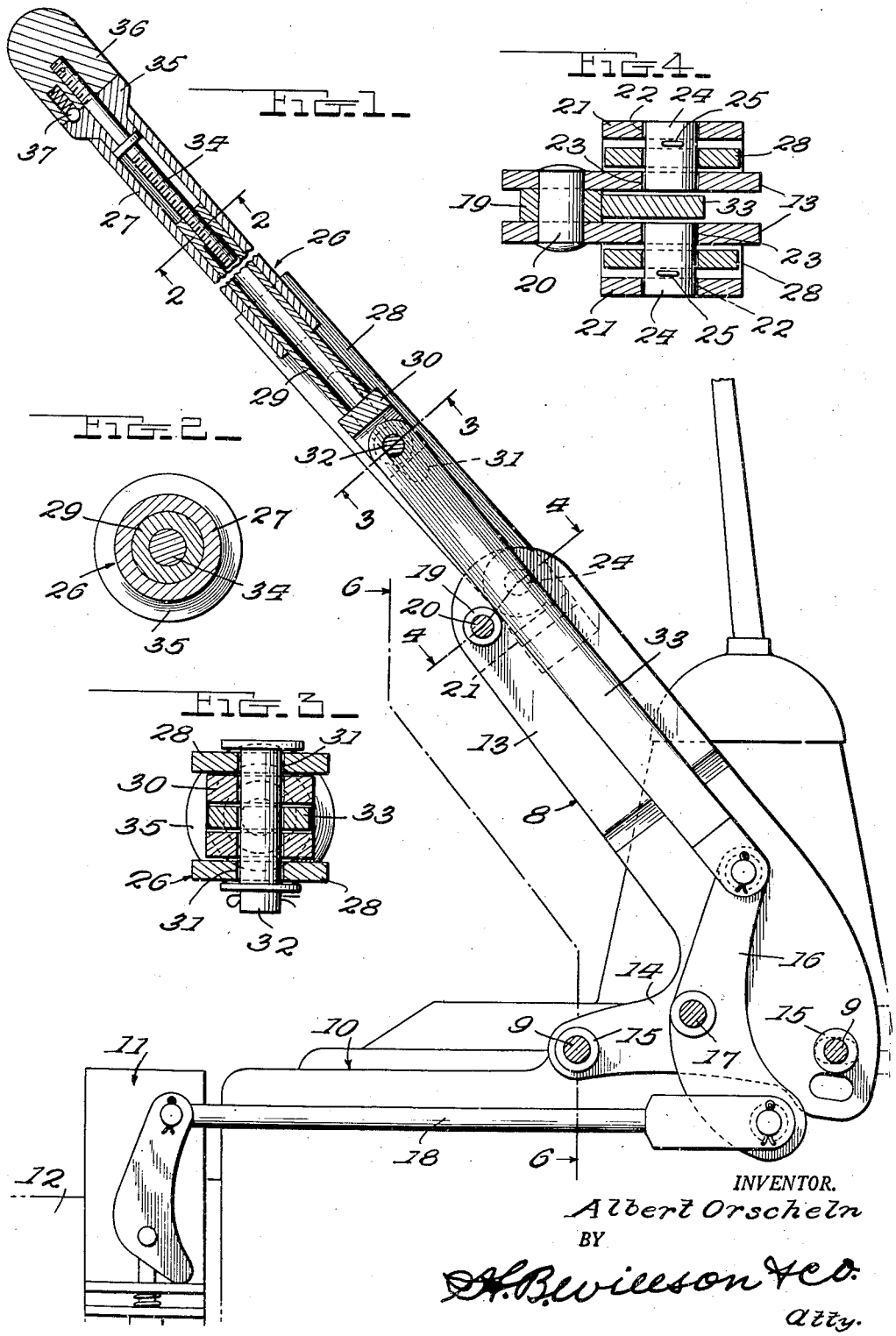

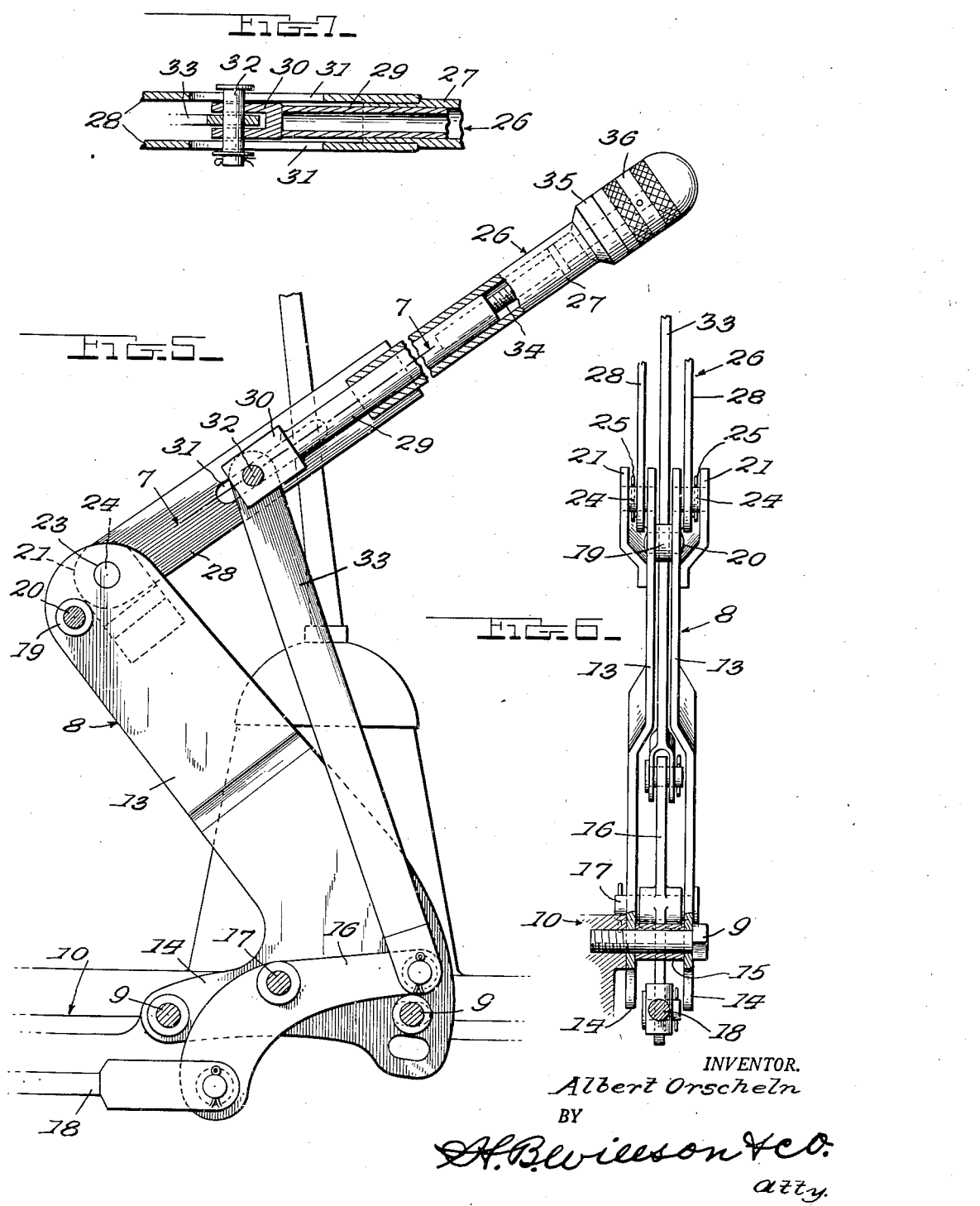

Patented Mar. 8, 1949

2,464,097

UNITED STATES PATENT OFFICE 2,464,097

BRAKE OPERATING OR SIMILAR MECHANISM

Albert Orscheln, Moberly, Mo., assignor of thirty-five one-hundredths to William C. Orscheln, Moberly, Mo., thirty-five one-hundredths to Edward J. Orscheln, Columbia, Mo., ten one-hundredths to Theodore B. Orscheln, Granite City, Ill., and ten one-hundredths to Aloysius G. Orscheln, Kansas City, Mo.

Application August 25, 1947, Serial No. 770,520

7 Claims. (Cl. 74—518)

The invention relates to a vehicle brake operating or similar mechanism of the general type shown in my U. S. Patent 2,171,403 of August 29, 1939, and like my companion applications Serial No. 770,518, filed August 25, 1947, and Serial No. 770,519, filed August 25, 1947, it aims to provide a new and improved construction well adapted to motor vehicles of present-day designs, and one which may be expeditiously manufactured at reasonable cost.

Figure 1 of the accompanying drawings is a vertical longitudinal sectional view showing the invention applied to the propeller shaft brake of an automobile.

Figs. 2, 3 and 4 are detail transverse sectional views on the correspondingly numbered lines of Fig. 1.

Fig. 5 is a view similar to Fig. 1, partly in elevation, showing the hand-lever in its normal idle position.

Fig. 6 is a rear elevation, partly in section as indicated by line 6—6 of Fig. 1.

Fig. 7 is a detail sectional view on line 7—7 of Fig. 5.

A preferred construction has been disclosed in the drawings and will be rather specifically described, but variations may be made within the scope of the invention as claimed.

An upstanding, rearwardly inclined body 8 is provided, to be secured by bolts, screws or the like 9 to the transmission casing 10 of an automobile, and in the present disclosure, the invention is used to operate a conventional brake 11 on the propeller shaft 12 extending rearwardly from said casing 10.

The body 8 includes two laterally spaced side plates 13 having widened lower ends 14 through which the bolts or the like 9 pass, said plate ends being spaced apart by means of sleeves 15 which surround said bolts. A lever 16 is fulcrumed at 17 between the plate ends 14 and is connected by a rod 18 with the brake 11. As shown in Figs. 1 and 6, the bolts or screws 9 are threaded in openings in the transmission casing 10, above which the vehicle floor board (not shown) is disposed and hence the upper portion of the body 8 is disposed above the floor board.

The upper ends of the side plates 13 are spaced apart by means of a spacing sleeve or the like 19 disposed near the lower edges of said plates, and a rivet or other fastener 20 extends through these plates and said sleeve. Two brackets 21 are welded or otherwise secured to the outer sides of the plates 13 at the upper ends of the latter, the major portions of said brackets being outwardly spaced from said side plates. These brackets and side plates are formed with alined openings 22 and 23, respectively, and these openings receive two axially spaced fulcrum pins 24, said fulcrum pins being held against sliding by means of cotter pins or the like 25.

A hand lever 26 is provided, having a tubular rear section 27 and a bifurcated front end, the furcations 28 of which are mounted upon the fulcrum pins 24, between the side plates 13 and the brackets 21, the cotter pins 25 being interposed between said furcations and said brackets. A tubular slide 29 is mounted longitudinally in the lever section 27 and is provided with a bifurcated head 30 between the furcations 28. At opposite sides of this head, the furcations 28 are formed with longitudinal slots 31, and a pin 32 extends through said slots and head. A pull link 33 connects the pin 32 with the lever 16 for operating the latter to apply the brake 11 when the hand lever 26 is swung rearwardly from the idle forwardly inclined or brake "off" position of Fig. 5, to the operative or brake "on" position of Fig. 1. In the latter position, the lever 26 projects longitudinally from the body 8 and is slightly past dead-center with the pull of the link 33 off-center and thus holding said lever in said operative position without the necessity of other holding means. The link 33 then rests against the spacer 19 as shown in Fig. 1. It will be noted that by mounting the hand lever on the upper end of the body a relatively short lever may be used and its fulcrum is disposed above the floor board and adjacent the gear shift lever as will be understood upon reference to Figs. 1 and 5. It will be further noted that the hand lever and the coacting elements are such that during a brake applying stroke of the hand lever it will initially have a low mechanical advantage and produce a rapid take up of the cable and that during the remainder of the stroke the mechanical advantage will increase while the take up of the cable will decrease.

An adjusting screw 34 is threaded into the tubular slide 29 and is rotatably mounted in a bushing 35 welded or otherwise secured to the lever section 27, said screw having a knob 36 by means of which it may be rotated to adjust the slide 29 longitudinally, thereby adjusting the entire brake-operating means to compensate for brake wear. A spring-pressed ball or the like 37, cooperable with a suitable socket, may well be employed for holding the knob 36 in adjusted position.

When the brake is to be set, it is simply necessary to swing the hand lever 26 from the position of Fig. 5 to that of Fig. 1, and in the latter position, said lever is slightly past dead-center and will be so held by the off-center pull of the link 33. To release the brake, it is simply necessary to again swing the lever 26 forwardly. Whenever brake adjustment is required, this may be quickly and easily effected by rotating the knob 36.

From the foregoing, taken in connection with the accompanying drawings, it will be seen that novel and advantageous provision has been made for carrying out the object of the invention, and while preferences have been disclosed, attention is again invited to the possibility of making variations within the scope of the invention as claimed.

What is claimed is:

1. A brake operating mechanism for mounting on a transmission casing of a motor vehicle comprising an elongated body inclined upwardly and rearwardly, said body including two unidirectional side plates and spacing means holding them in laterally spaced relation, the lower portions of said plates being widened and having means for attachment to a transmission casing, a brake connection, a brake-connection actuating lever disposed between said plates and fulcrumed between its ends on a transverse axis to said widened portions of said plates, the lower end of said actuating lever being attached to said brake connection, a hand lever having a bifurcated lower end the furcations of which are fulcrumed on the upper ends of said plates, said hand lever being swingable from a forwardly inclined idle position to a rearwardly inclined operative position in which it projects longitudinally from the upper end of said body, a slide carried by said hand lever and having a portion between said furcations thereof, said hand lever having means for adjusting said slide longitudinally of said furcations, and a pull link having its lower end connected to the upper end of said actuating lever and its upper end connected to said slide, whereby during an operating stroke of said hand lever, the latter will initially have a low mechanical advantage and will produce a rapid take up of the brake connection and during the remainder of the stroke the mechanical advantage will increase while the take up of the brake connection will decrease.

2. A structure as specified in claim 1, said hand lever being swingable slightly past dead-center to said operative position, and stop means for limiting the past-dead-center movement of said hand lever.

3. A brake operating mechanism for mounting on the transmission casing of a motor vehicle comprising an elongated body inclined upwardly and rearwardly, said body including two unidirectional side plates widened at their lower ends and spacing means holding said plates in laterally spaced relation, said lower ends of the plates having means for attachment to a transmission casing, a brake-connection, a brake-connection actuating lever between said lower ends of the plates and fulcrumed between its ends on said plates, the lower end of said actuating lever being connected to said brake connection, a hand lever having a bifurcated lower end the furcations of which are formed with opposed longitudinal slots and have their lower ends fulcrumed on the upper ends of said side plates, said hand lever being swingable from a forwardly inclined idle position to a rearwardly inclined operative position in which it projects longitudinally from the upper end of said body, a slide carried by said hand lever and having a portion between said furcations thereof, a transverse pin carried by said portion of the slide and slidably engaged with said slots, said hand lever having means for adjusting said slide longitudinally of said furcations, and a pull link having its lower end connected to the upper end of said actuating lever and its other end connected to said pin.

4. A structure as specified in claim 3, said hand lever being swingable slightly past dead-center to said operative position, a portion of said spacing means and said pull link being so located to abut each other and limit the past-dead-center movement of said hand lever.

5. A brake operating mechanism for mounting on the transmission casing of a motor vehicle comprising an elongated body inclined upwardly and rearwardly, said body having means at its lower end for attachment to a transmission casing, a brake connection, a brake-connection actuating lever fulcrumed between its ends on said lower end of said body, a hand lever fulcrumed at its lower extremity on the projecting upper end of said body, a slide longitudinally movable on the intermediate portion of said hand lever, a pull link pivotally connected at its lower end to the upper end of said actuating lever and at its upper end to said slide, said hand lever being swingable from an idle position in which it extends forwardly at an angle to the upper end of said body to an operative brake-applied position in which it extends longitudinally of said body from the upper end of the latter, the movement of the hand lever to said operative position causing the longitudinal axis of said pull link to pass the dead center of the hand lever fulcrum, step means on said body engageable by said link to limit the past-dead-center movement of the hand lever to brake-applied position, and manually actuated means carried by said hand lever to adjust said slide.

6. A brake operating or similar mechanism comprising an elongated body including two unidirectional side plates and spacing means holding them in laterally spaced relation, said body having means at one end whereby it may be fixedly mounted, a work-performing lever between the ends of said side plates at said one end of said body and fulcrumed to said plates on a transverse axis, a hand lever having a bifurcated end the furcations of which are fulcrumed to the other ends of said side plates, said hand lever being swingable from an idle position to an operative position in which it projects longitudinally from said body, a slide carried by said hand lever and having a portion between said furcations thereof, said hand lever having means for adjusting said slide longitudinally of said furcations, and a pull link connecting said slide with the first mentioned lever.

7. A brake operating or similar mechanism comprising two laterally spaced elongated side plates widened at one end, spacers between said widened ends of said plates and attaching bolts extending through said plate ends and spacers, a work-performing lever fulcrumed between said widened ends of said plates on an axis parallel with said attaching bolts, an additional spacer between the other ends of said side plates and a fastener passing through this spacer and said side plates, a hand lever having a bifurcated end the furcations of which are fulcrumed to said other ends of said side plates, said hand lever being swingable from an idle position to an operative position in which it projects longitudinally from said side plates, and a pull link connecting said hand lever with the first mentioned lever, said hand lever being swingable slightly past dead-center to said operative position, said pull link and said additional spacer being located to abut each other and limit the past-dead-center movement of said hand lever.

ALBERT ORSCHELN.

REFERENCES CITED

The following references are of record in the file of this patent:

UNITED STATES PATENTS

| Number | Name | Date |
|---|---|---|
| 307,903 | Benthin | Nov. 11, 1884 |
| 562,956 | Ganswindt | June 30, 1896 |
| 874,086 | Kimbro | Dec. 17, 1907 |
| 1,817,844 | Purcell | Aug. 4, 1931 |
| 2,240,783 | Jandus | May 6, 1941 |